US010019557B2

(12) United States Patent
Bradley

(10) Patent No.: US 10,019,557 B2
(45) Date of Patent: Jul. 10, 2018

(54) METHOD, SYSTEMS, AND APPARATUS FOR FRAGMENTED FILE SHARING

(71) Applicant: Intertrust Technologies Corporation, Sunnyvale, CA (US)

(72) Inventor: William Benjamin Bradley, Newark, DE (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

(21) Appl. No.: 15/143,895

(22) Filed: May 2, 2016

(65) Prior Publication Data

US 2016/0342773 A1 Nov. 24, 2016

Related U.S. Application Data

(63) Continuation of application No. 13/846,118, filed on Mar. 18, 2013, now Pat. No. 9,344,473, which is a
(Continued)

(51) Int. Cl.
*G06F 7/04* (2006.01)
*G06F 21/10* (2013.01)
(Continued)

(52) U.S. Cl.
CPC ............ *G06F 21/105* (2013.01); *G06F 21/10* (2013.01); *H04L 63/08* (2013.01); *H04L 63/10* (2013.01);
(Continued)

(58) Field of Classification Search
CPC .................. G06F 21/105; G06F 21/10; G06F 2221/0784; G06F 2221/0788; H04L 63/08;
(Continued)

(56) References Cited

U.S. PATENT DOCUMENTS 6,798,788 B1 9/2004 Viswanath et al.
6,920,550 B2 7/2005 Des li
(Continued)

FOREIGN PATENT DOCUMENTS

JP 2002373134 12/2002
JP 2003143131 5/2003
(Continued)

OTHER PUBLICATIONS

PCT International Search Report and Written Opinion dated Jun. 12, 2008, in related International Application No. PCT/US2008/000654.
(Continued)

*Primary Examiner* — Techane Gergiso
(74) *Attorney, Agent, or Firm* — Finnegan, Henderson, Farabow, Garrett & Dunner, LLP

(57) ABSTRACT

Systems, methods, software, and apparatus are described for facilitating the distribution and management of fragmented content. In one embodiment, a packager packages content into fragments and generates a manifest including policies and metadata associated with the content. A downloader obtains the manifest, and uses it to obtain the content from one or more uploaders. For example, a downloader might forward a search request to one or more trackers, which, in turn, are operable to locate one or more uploaders that can meet the request, subject to any relevant policy limitations. The uploaders forward fragments to the downloader, subject to any relevant policy. The downloader assembles the content from the fragments. The operations and interactions of the entities can be subject to policy limitations associated with the fragments, the content as a whole, or the like.

19 Claims, 15 Drawing Sheets

Related U.S. Application Data continuation of application No. 12/016,140, filed on Jan. 17, 2008, now Pat. No. 8,402,556.

(60) Provisional application No. 60/885,364, filed on Jan. 17, 2007.

(51) Int. Cl.
*H04L 29/06* (2006.01)
*H04L 29/08* (2006.01)

(52) U.S. Cl.
CPC .............. *H04L 65/60* (2013.01); *H04L 67/06* (2013.01); *H04L 67/104* (2013.01); *G06F 2221/0784* (2013.01); *G06F 2221/0788* (2013.01); *H04L 63/20* (2013.01); *H04L 2463/101* (2013.01)

(58) Field of Classification Search
CPC ......... H04L 63/10; H04L 65/60; H04L 67/06; H04L 67/104; H04L 63/20; H04L 2463/101; H04L 2209/603
See application file for complete search history.

(56) References Cited

U.S. PATENT DOCUMENTS

| | | | |
|---|---|---|---|
| 7,496,540 B2* | 2/2009 | Irwin | G06F 21/10 705/50 |
| 7,639,805 B2 | 12/2009 | Li et al. | |
| 8,402,556 B2 | 3/2013 | Bradley | |
| 2002/0095582 A1 | 7/2002 | Peled et al. | |
| 2002/0133491 A1* | 9/2002 | Sim | G06F 17/30067 |
| 2002/0143798 A1 | 10/2002 | Lisiecki et al. | |
| 2002/0143888 A1 | 10/2002 | Lisiecki et al. | |
| 2002/0147774 A1 | 10/2002 | Lisiecki et al. | |
| 2003/0084341 A1 | 5/2003 | Ramachandran et al. | |
| 2003/0101381 A1 | 5/2003 | Mateev et al. | |
| 2003/0172035 A1 | 9/2003 | Cronce et al. | |
| 2003/0204613 A1* | 10/2003 | Hudson | D01D 5/423 709/231 |
| 2003/0220883 A1* | 11/2003 | Block | G06F 21/105 705/59 |
| 2004/0148326 A1 | 7/2004 | Nadgir et al. | |
| 2004/0162886 A1 | 8/2004 | Ims et al. | |
| 2004/0244807 A1 | 12/2004 | Sun et al. | |
| 2004/0261069 A1 | 12/2004 | Verbeke et al. | |
| 2005/0010804 A1* | 1/2005 | Bruening | G06F 21/52 726/1 |
| 2005/0086501 A1* | 4/2005 | Woo | G06F 21/10 713/189 |
| 2005/0132207 A1* | 6/2005 | Mourad | G06F 21/10 713/189 |
| 2005/0210035 A1 | 9/2005 | Kester et al. | |
| 2006/0053209 A1 | 3/2006 | Li | |
| 2006/0140134 A1 | 6/2006 | O'Brien et al. | |
| 2006/0200736 A1 | 9/2006 | Smit et al. | |
| 2006/0206486 A1 | 9/2006 | Strickland | |
| 2006/0218650 A1 | 9/2006 | Costa-Requena et al. | |
| 2006/0271926 A1 | 11/2006 | Hutton et al. | |
| 2006/0277151 A1 | 12/2006 | Sankaran et al. | |
| 2007/0055765 A1 | 3/2007 | Lisiecki et al. | |
| 2007/0056002 A1 | 3/2007 | Ganesan et al. | |
| 2007/0124310 A1 | 5/2007 | Mathur | |
| 2007/0180144 A1 | 8/2007 | Basu et al. | |
| 2007/0180490 A1 | 8/2007 | Renzi et al. | |
| 2007/0198468 A1 | 8/2007 | Berger | |
| 2007/0198570 A1 | 8/2007 | Prahlad et al. | |
| 2007/0245409 A1 | 10/2007 | Harris et al. | |
| 2007/0266446 A1 | 11/2007 | Aaron | |
| 2008/0065771 A1 | 3/2008 | Marvit et al. | |
| 2008/0077638 A1* | 3/2008 | Monk | G06F 17/30138 |
| 2008/0127342 A1 | 5/2008 | Roesch et al. | |
| 2009/0083857 A1 | 3/2009 | Ueno et al. | |
| 2013/0275559 A1 | 10/2013 | Bradley | |

FOREIGN PATENT DOCUMENTS

| | | |
|---|---|---|
| JP | 2004259266 | 9/2004 |
| JP | 2005339171 | 12/2005 |
| JP | 2006012192 | 1/2006 |
| WO | WO 2002/051057 A2 | 6/2002 |

OTHER PUBLICATIONS

Christos Gkantsidis, "Avalanche: File Swarming with Network Coding," http://research.microsoft.com/camsys/avalanche/ p. 1, Jan. 22, 2005.
Bittorrent Protocol Specification v.1.0, BitTorrentSpecification—TheoryOrg, http://wiki.theory.org/BitTorrentSpecification, pp. 1-19, as of Nov. 13, 2008.
"Darknet (file sharing)," Darknet (file sharing)—Wikipedia, the free encyclopedia, http://en.wikipedia.org/wiki/Darknet_(file_sharing), pp. 1-3, as of Nov. 13, 2008.
Lars Pasveer, "VCR-like box boasts P2P content at push of button," VCR-like box boasts P2P content at push of button—CNET News http://news.cnet.com/VCR-like-box-boasts-P2P-content-at-push-of-button/2100-1025_3-5977062.html?tag=nefd.top Nov. 30, 2005, p. 1-2.
Examination Report dated Jun. 15, 2010 for related European Application No. 08705621.4.
Examination Report dated Jan. 28, 2011 for related Australian Application No. 2008205545.
Office Action dated Feb. 2, 2011 for U.S. Appl. No. 12/016,140, filed Jan. 17, 2008.
Office Action dated Oct. 13, 2011 for U.S. Appl. No. 12/016,140, filed Jan. 17, 2008.
English translation of First Office Action dated Jan. 18, 2012 for Chinese Application No. 20088008706.5.
Office Action dated Mar. 21, 2012 for U.S. Appl. No. 12/016,140, filed Jan. 17, 2008.
Notice of Acceptance dated Feb. 22, 2012, for Australian Patent App. No. 2008205545.
English translation of Office Action dated May 8, 2012 for Japanese Patent Application No. 2009-546426.
English translation of Third Office Action dated Jun. 3, 2013 for Chinese Patent Application No. 200880008706.5.
Office Action dated Apr. 10, 2014 for U.S. Appl. No. 13/846,118, filed Mar. 18, 2013.
Office Action dated Aug. 28, 2014, in related Canadian Application No. 2,675,595.
Extended European Search Report dated Feb. 3, 2015, in related European Application No. 14188753.9.
Office Action dated May 1, 2015, in related Canadian Application No. 2,675,595.
Notice of Allowance dated Sep. 14, 2015 for U.S. Appl. No. 13/846,118, filed Mar. 18, 2013.

* cited by examiner

US 10,019,557 B2

METHOD, SYSTEMS, AND APPARATUS FOR FRAGMENTED FILE SHARING

RELATED APPLICATION

This application is a continuation of U.S. patent application Ser. No. 13/846,118, filed Mar. 18, 2013, which is a continuation of U.S. patent application Ser. No. 12/016,140, filed Jan. 17, 2008 (now U.S. Pat. No. 8,402,556), which claims the benefit of priority from U.S. Provisional Patent Application No. 60/885,364 filed Jan. 17, 2007, all of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND AND SUMMARY

Peer-to-Peer ("P2P") fragmented file sharing systems such as BitTorrent, eDonkey2000, eMule, and KaZaA have become a very popular medium for distributing content on the Internet—especially content that is relatively large, such as a video file. However, these systems can be problematic from a reliability and/or security perspective, which has limited the commercial viability of using such systems to distribute valuable content items.

Systems, methods, apparatus, and software are described herein for distributing content in a way that ameliorates some or all of the problems described above.

DETAILED DESCRIPTION OF ILLUSTRATIVE EMBODIMENTS

As used herein, the following terms will generally have the following meanings, unless otherwise clear from the context:

"Content" (or "digital content" or "electronic content") refers generally to any and all types or formats of data or other information stored and/or transmitted electronically. Examples of content include, but are not limited to, a piece of software, digital music, a digital movie, a digital image, a piece of multimedia, an electronic book or other document, and the like.

"Content fragment" (or "fragment") refers generally to a subset of a piece of content (e.g., a part of a movie, a part of a song, a part of a file containing an image, etc.). Fragments may be generated dynamically or can be static. "Content fragment" includes, but is not limited to, individual files.

The term "downloader" refers generally to an entity that obtains content fragments, assembles them into a usable piece of content, and (typically) consumes or renders the piece of content (e.g., plays, views, and/or runs the content).

The term "manifest" refers generally to a file or other data item that includes details about the fragments that comprise a piece of content. As described in more detail below, a manifest may include content metadata, fragment-level policies, content-level policies, information related to content or fragment discovery (such as contact information for appropriate trackers), and/or the like.

The term "packager" refers generally to an entity that performs processing associated with the preparation of content and/or fragments. For example, packagers may transform content into fragments, generate one or more manifests with associated policy information (possibly including policy provided from other sources), and/or perform other tasks related to preparing content or fragments for distribution.

The term "policy" refers generally to a set of one or more rules or procedures, such as rules or procedures relating to how a piece of content may be obtained, accessed, used, and/or the like, and/or relating to how entities within a system may interact.

The term "policy enforcement point" (or "PEP") refers generally to an entity (such as a computer system, piece of software, a software-based agent, or the like) that enforces policy, such as policy related to authentication, integrity, confidentiality, authorization, and/or the like. In some embodiments, some or all of packagers, trackers, uploaders, and/or downloaders may serve as policy enforcement points.

The term "tracker" refers generally to an entity that facilitates the discovery and/or retrieval of content and/or associated metadata. In preferred embodiments, uploaders and associated content fragments are discovered via one or more trackers. Trackers typically interact with uploaders and downloaders by exchanging information via agreed upon transport channels.

The term "uploader" refers generally to an entity that provides access to content fragments.

Figure 1:
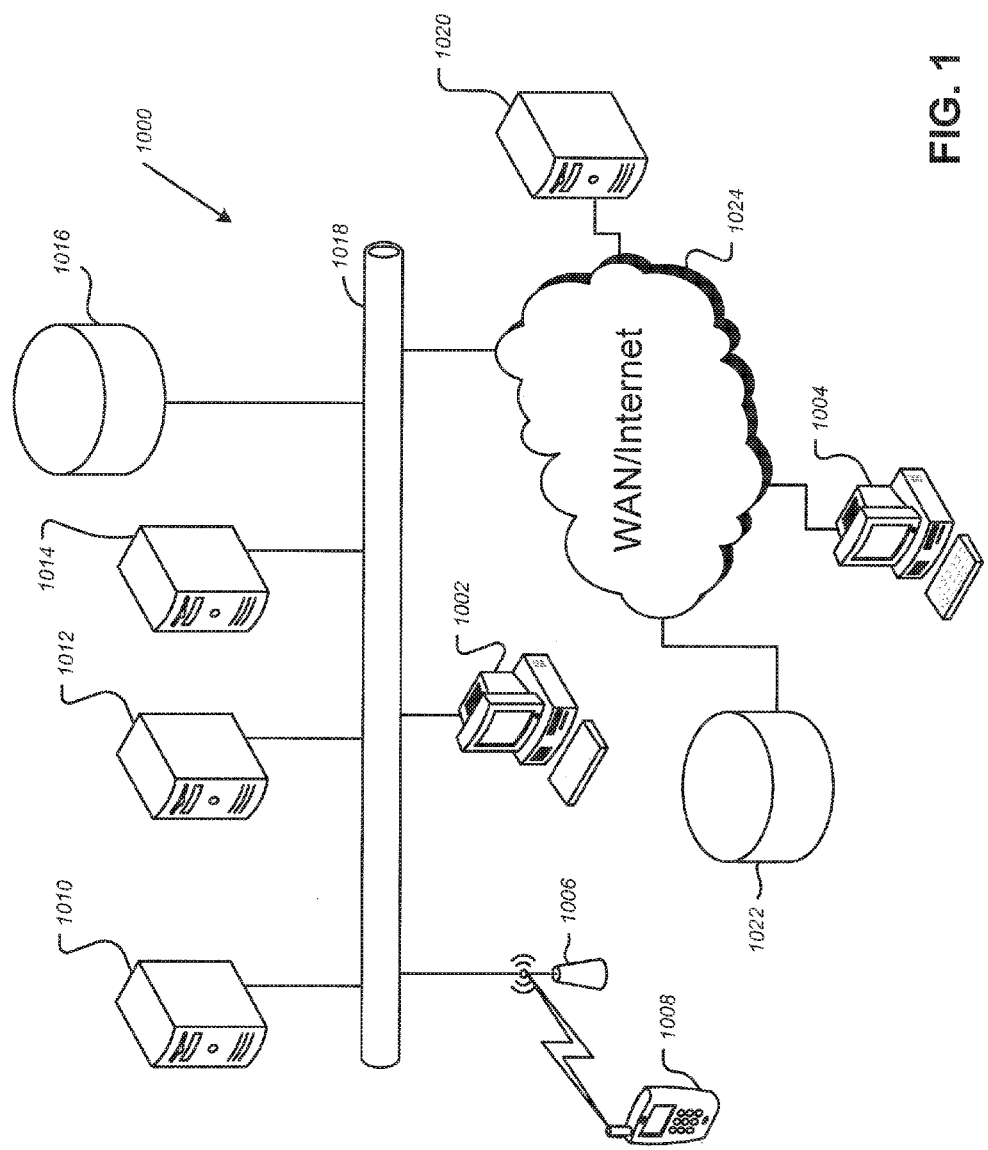
FIG. 1 is a schematic representation of a computer network for performing fragmented file sharing.

FIG. 1 shows an illustrative embodiment of a system for sharing fragmented content. The illustrative system shown in FIG. 1 includes a computer network (1000) including a computer (1002) that is configured to create and distribute (and optionally, to retrieve and use) digital content that is comprised of a plurality of content fragments, which can be combined (e.g., concatenated) to provide the receiver with a piece of usable digital content. As shown in FIG. 1, content can, for example, be distributed via one or more networks (1018, 1024) from computer (1002) to a receiving computer (1004), and/or broadcast by base station (1006) to a portable device (1008) such as a laptop computer, personal digital assistant (PDA), portable media player, or cellular phone. Alternatively, or in addition, the fragmented content can be combined and transmitted (e.g., by streaming) to the receiving computer and/or device (1004 and/or 1008). In one embodiment, each of the content fragments has an associated identifier and information effective to verify its integrity, such as a checkable hash (e.g., a SHA1 hash or any other suitable hash), or a checkable digital signature (e.g., an RSA or SHA1 signature, or any other suitable signature).

With continued reference to FIG. 1, in one embodiment the fragmented content is located on one or more server computers (1010, 1012, 1014, 1020) or databases (1016, 1022) in networked electronic communication (1018, 1024) with computer 1002. For example, the fragmented content can be located on one or more servers (1020) or databases (1022) networked with computer 1002 across a wide area network (1024) such as, or including, the Internet. Similarly, receiving computer (1004) can be in networked communication with the devices (1002, 1010, 1012, 1014, 1016, 1020, 1022, 1008) storing and transmitting the fragmented content, either locally or over a wide area network (e.g., the Internet). The receiving computer (1004) obtains the fragmented content using any suitable communications protocol (e.g., TCP/IP).

Figure 2:
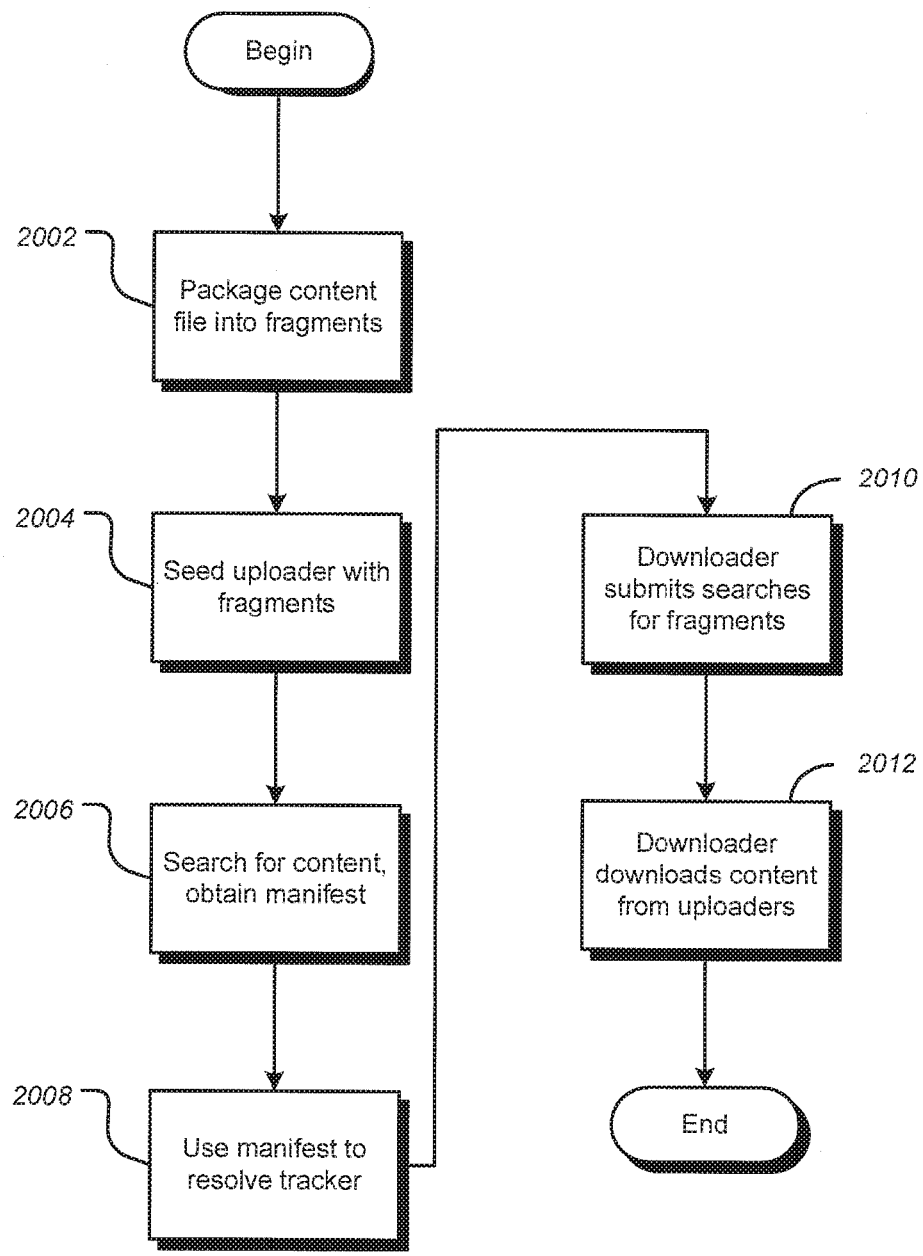
FIG. 2 is a flowchart illustrating a process for performing fragmented file distribution.

An overview of an illustrative method for performing fragmented file sharing is shown in FIG. 2. Digital content, created using methods and instrumentation known in the art (e.g., using a computer, such as computer 1002 shown in FIG. 1), is packaged into fragments. One or more manifests can also be generated at this point, and, in one embodiment, the manifest(s) and/or one or more of the fragments can include or reference one or more policies. The fragments are seeded to one or more uploaders (2004). In practice, the packager will often act as the initial uploader, although it is not required that this be the case. A user (e.g., such as the user of computer 1004, shown in FIG. 1) obtains a manifest associated with the fragments by executing a search (2006) (e.g., using a search engine, directory, web service, and/or the like) and/or in any other suitable manner. The manifest is then used to find a tracker (2008). In other embodiments, mechanisms can be used to find trackers other than with a manifest. For example, the information could simply be stored at a predefined location, provided via a look-up directory, or the like.

Referring once again to FIG. 2, the downloader submits searches for fragments to the tracker (2010) and downloads fragments from the uploader(s) (2012). In some preferred embodiments, some or all of the interactions described above are governed by policies, which can take any suitable form, as described in more detail below.

Figure 3:
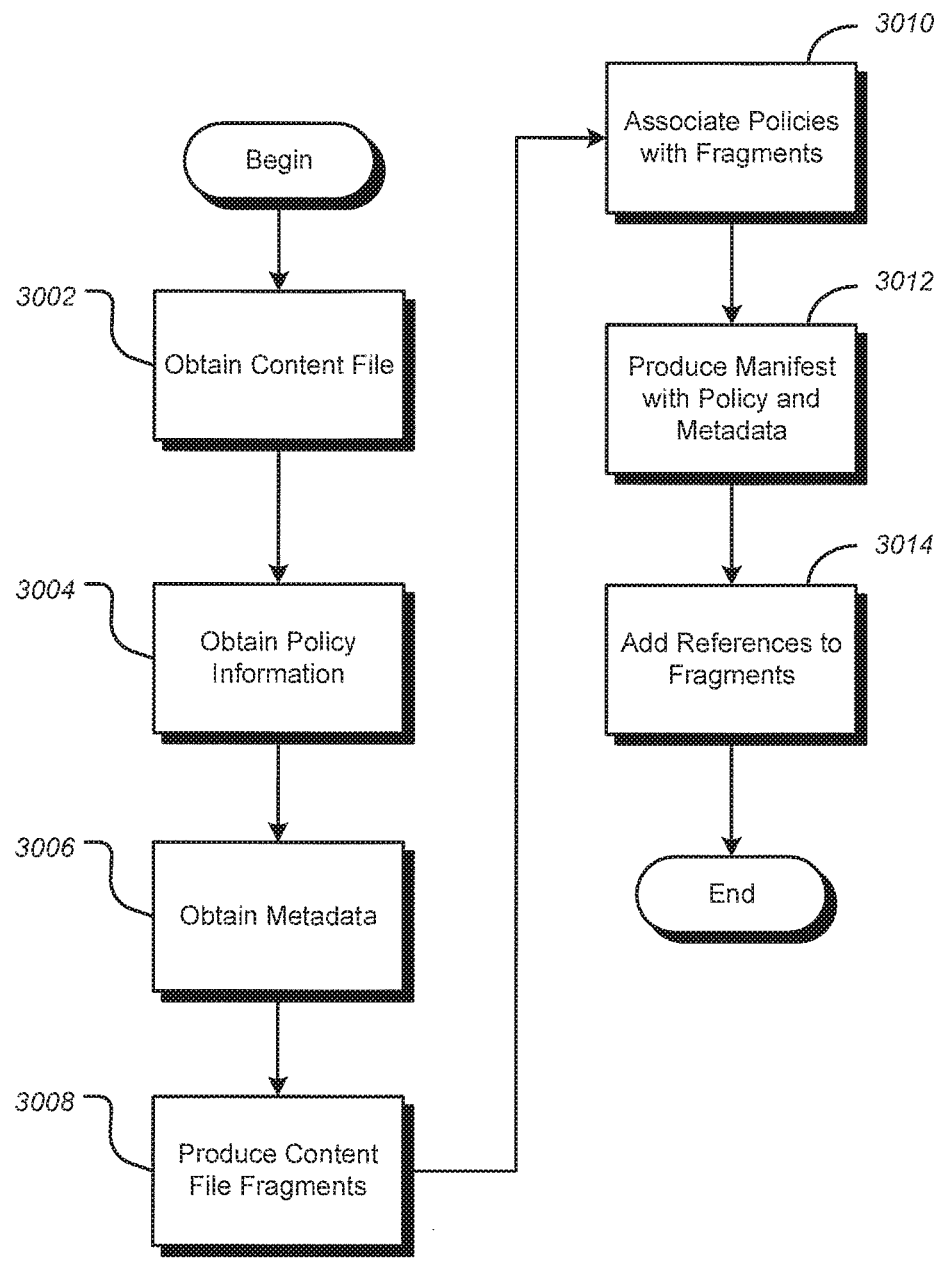
FIG. 3 is a flowchart illustrating a process of creating a fragmented file.

An illustrative method for packaging digital content into fragments and uploading the fragments and associated information is shown in FIG. 3. The digital content is obtained (3002) from a source such as a server, archival storage (e.g., tape or optical media), or a database. Policy information for the digital content is also retrieved or generated (3004). Such policy information can, for example, include instructions and/or limitations on the distribution of the digital content and/or the resulting fragments. In one non-limiting example, policies are associated with file types and/or actions are conditioned on file type. For example, a file type may imply that a certain type of policy should apply. For example, a movie studio may generate content and send it to a packager who knows that all such content is supposed to have certain information in its associated manifest and/or policies. For example, one of the policies might be that the recipient of such content needs to obtain (or have) a valid license to use the content. In some embodiments, the policies are assigned manually, e.g., using an operator user interface. In other embodiments, policies are assigned by the intelligent/automatic operation of software, using file types, semantic cues, and/or content analysis. It will be appreciated that the determination of appropriate policies and their implementation will depend on the application at hand, and that any suitable policies or policy implementations can be used. In some embodiments, certain content fragments can be static, while others—e.g., a digital rights management ("DRM") license—may be dynamic (e.g., synthesized on the fly). For example, the policy associated with a piece of content may require the user to obtain (or demonstrate ownership of) a valid license, which might itself be contained in or referenced by a fragment that the policy indicates is to be dynamically generated.

For example, without limitation, an XML description of policy related to a piece of content as a whole and/or to a specific content fragment might include: a distribution (authentication) policy, specifying, for example, the nature and/or identity of the intermediaries that may process the content, a requirement that content must come from a specific end point, a requirement that the content must not be cached as it is synthesized (e.g., that it be dynamically generated or obtained, such as a license fragment or an advertisement), and/or the like; an authorization policy in which an attribute of a fragment is required by the policy and must be verified; an integrity, policy defining how the content can be verified as a whole (e.g., what fragments must be present in the content); and/or a confidentiality policy (e.g., describing whether a protected channel is required for retrieving the fragments). One illustrative example of a policy is shown below.

```
<ContentPolicy id="1">
    <DistributionPolicy id="100">
        <TrustAnchor>
            <X509Certificate/>
        </TrustAnchor>
    </DistributionPolicy>
    <IntegrityPolicy id="200">
        <Ordering type="any"/>
        <Validation type ="Fragment"/>
    </IntegrityPolicy>
    <ConfidentialityPolicy id="300">
        <ProtectedChannel type="SSL"/>
    </ConfidentialityPolicy>
    <Fragment id= "F1">
        <IntegrityPolicy/>
    </Fragment>
    ...
</ContentPolicy>
```

In the example policy shown above, a distribution policy is defined that requires digital signatures of any entities wishing to process (e.g., upload or download) the associated content to ultimately derive from a trust anchor having the specified X.509 certificate. Alternatively, or in addition, the distribution policy could require entities wishing to process the associated content to present credentials or attributes (e.g., SAML assertions) associated with systems and/or application programs that will process the content (e.g., DRM engines, file sharing software, etc.) attesting to the nature of such systems and/or application programs, such as their possession of certain features, their version number, and/or the like. For example, the distribution policy might include a <RequiredAttribute> field that specifies a SAML assertion that must be presented by the requesting system, thereby enabling, for the purposes of policy specification and enforcement, attributes of a system to be decoupled from the identity of the entity using the system. In some embodiments, the policy might specify that only certain entities (e.g., uploader, downloaders, or trackers) need to present a digital signature in order to process the content. For example, in some embodiments the policy might include an attribute field that specifies that it applies only to, e.g., uploaders, whereas a policy that did not include such a field might be applied generally to all entities.

Referring back to the example policy shown above, the integrity policy indicates that fragments can be received in any order, and that validation is to be performed on a fragment-by-fragment basis. In other examples, an integrity policy might require fragments to be obtained in a particular order (e.g., fragments containing commercials must be downloaded and/or consumed first, fragment(s) containing a license must be obtained first, and/or the like), and/or validation could be performed on a content-as-a-whole (or some other) basis, rather than on a fragment-by-fragment basis. In other examples, no integrity policy might be specified.

The example policy shown above also specifies a confidentiality policy that requires use of a protected channel when communicating the fragments. As shown above, the policy also specifies an integrity policy that is to be used in validating certain individual fragments. For example, the <IntegrityPolicy/> field associated with the fragment "F1" might indicate that the fragment needs to be validated using a hash, a digital signature, and/or the like. In the embodiment that is illustrated above, the other fragments in the piece of content would be processed using a default integrity policy (e.g., specifying that integrity is to be verified using a hash, or that no integrity policy need be applied). As a general matter, in some embodiments, fragments, and/or the content as a whole, can be processed using certain default policies, and the specification of additional or alternative policy parameters in the manifest associated with a specific piece of content can convey additional or alternative policies that deviate, or supplement, the default policy that would have been applied in the absence of any such policy specification in the manifest. In other embodiments, no default policies are employed, and the policies for each fragment might be required to be explicitly specified in the manifest associated with the piece of content.

While an illustrative content policy has been described, it should be appreciated that any suitable policy could be defined, including a policy that did not include some of the fields or values shown above, or a policy that included fields or values that are not shown. Thus it should be appreciated that any suitable policy, defined in any suitable form, can be used.

Continuing with the example embodiment illustrated in FIG. 3, metadata for the digital content and/or fragments is obtained (3006). The metadata may, for example, be provided both at the content level and the fragment level, and may comprise any information that characterizes the data in the content and/or fragment. Examples of metadata include, but are not limited to: the title of the digital content, the name of the content's author and/or other rights holder(s), other content identifiers, information regarding the location of one or more trackers, content running time, content warnings, tracking codes, and/or the like. The metadata can be provided manually, extracted automatically from the content and placed in the manifest, or provided by a combination of automatic and manual operations. One example is included in the illustrative manifest data structure described below.

In the example shown in FIG. 3, once the metadata has been defined or otherwise obtained, the fragments are produced from the digital content (3008). In one embodiment, the file fragments are produced using a packager that processes the content into fragments and then packages the fragments with the metadata and policies (3012, 3014), and passes or seeds some or all of the foregoing to one or more uploaders. In some embodiments, the uploader handles the packaging operations in addition to the other functions described herein in connection with uploaders. In other embodiments, the packager and uploader(s) are separate. It will be appreciated that FIG. 3 (and the other flowcharts presented herein) has been provided for purposes of illustration, and that in other embodiments the order of the steps shown in FIG. 3 could be varied, certain steps could be omitted, and/or additional steps could be added.

Figure 4:
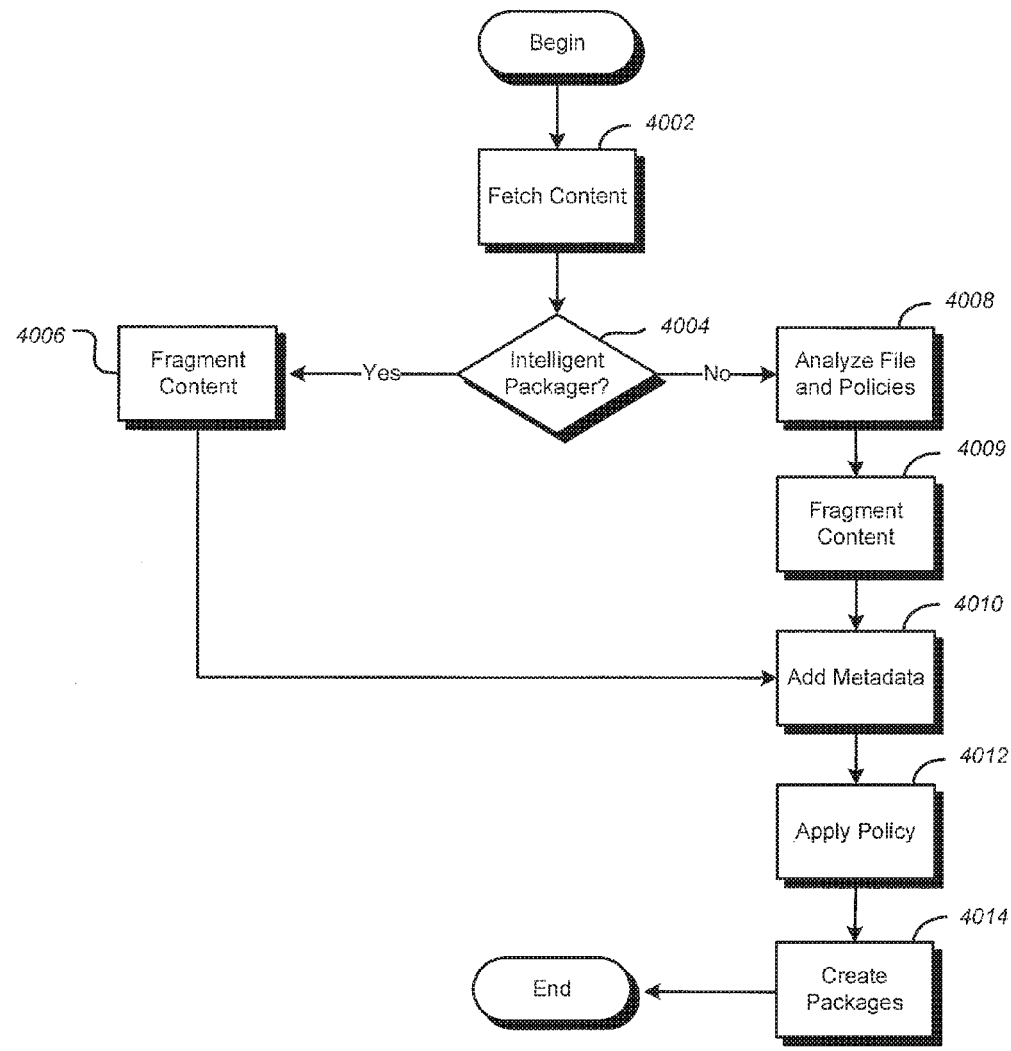
FIG. 4 is a flowchart illustrating a process for uploading fragmented files.

One example of the operation of a packager is shown in FIG. 4. Referring to FIG. 4, the digital content is fetched by the packager (4002), if the packager is designed to automatically package content in accordance with policies (i.e., the packager is "intelligent", as indicated by a "Yes" exit from block 4004), then the files are fragmented automatically by the packaging software and/or hardware (4006) using various algorithms and criteria for breaking the content into fragments. Examples of such criteria include policy parameters (e.g., a policy might say that licenses are to be packaged in separate fragments, since they may be user-specific, another policy might require the user to receive/download the license fragment first, etc.), system limitations (e.g., throughput capacity), and content breakpoints for offering different fragment combination options (e.g., a specification of natural content breakpoints based on nature of the content), such as different fragments for directed advertising or directed content (e.g., content directed to adult or mixed adult-child audiences). The operation flow then moves to 4010 as described below. Alternatively, if the packager is not intelligent (i.e., a "No" exit from block 4004), then the file fragments can be created using operator intervention. For example, an operator can analyze the content and policies (4008) and create the fragments (4009).

For example, if the packager (or an uploader configured to act as a packager) is not intelligent, then the operator might manually direct packaging of the license and one or more content chunks separately into fragments since the operator may understand the intended use of the content and how players want to consume the content. Alternatively, a default packaging policy can be provided for the case of non-intelligent packagers that does not require operator intervention. For example, the policy might be to package the content into equal-sized fragments of N bytes.

In the example shown in FIG. 4, once the fragments have been formed, any metadata is added (4010), and/or policies applied (4012). Alternatively, or in addition, some or all of steps 4010 and/or 4012 can be performed before or concurrently with the fragmentation of the content.

Returning to FIG. 3, the policies identified or generated in block 3004 are associated with the fragments (3010), and a manifest comprising the metadata and policy information is formed (3012). In one embodiment, references to, and descriptions of, the relevant fragments are added to the manifest (3014). One example of a manifest data structure is shown below.

```xml
<Manifest>
    <Metadata>
        <ContentID>122</ContentID>
        <Title>A Test Movie</Title>
    </Metadata>
    <ContentPolicy>
        <DistributionPolicy id="100">
            <TrustAnchor>
                <X509Certificate/>
            </TrustAnchor>
        </DistributionPolicy>
        <IntegrityPolicy id="200">
            <Ordering type="any"/>
            <Validation type="Fragment"/>
        </IntegrityPolicy>
        <ConfidentialityPolicy id="300">
            <ProtectedChannel value="SSL"/>
        </ConfidentialityPolicy>
    </ContentPolicy>
    <Fragments>
        <Fragment id="F0">
            <Size>10000</Size>
            <ContentPolicy>
                <IntegrityPolicy id="200">
                    <Validation type="sha1" value ="xxxxxxx"/>
                </IntegrityPolicy>
            </ContentPolicy>
        </Fragment>
    </Fragments>
</Manifest>
```

The manifests and fragments are then registered with one or more trackers, which facilitate the provision of fragments to recipients wanting to access the digital content. For example, trackers might identify one or more active uploaders, and/or one or more uploaders who possess the fragments for which the recipient (e.g., downloader) is looking.

In one embodiment, trackers handle registration requests from uploaders and downloaders. For example, uploaders might provide their identity information (e.g., an X.509 certificate), to the tracker(s), along with their endpoint address (e.g., a TCP/IP address) and identifiers of the fragments that they have available for uploading. In some embodiments, much of the information associated with registration between an uploader or downloader and a tracker is informative (such as information used for statistical or marketing purposes, or related to user experience, such as a specification of the number of files served, the average service time, and/or the like), and thus optional unless mandated otherwise. In other embodiments, such as embodiments with policy-mandated quality of service requirements, such information might be required. In a preferred embodiment, information related to the determination and enforcement of policy ("correctness") is also included. For example, a tracker might, in accordance with policy, use this information to determine if it trusts the particular uploader or downloader, and/or if it is authorized to provide services to the uploader or downloader. In some embodiments, if the tracker determines that the particular uploader or downloader is trusted, and/or that the uploader or downloader is authorized to make use of the tracker's services, then the tracker may send an acknowledgment or other response to the uploader or downloader, and (optionally) any relevant statistics. Non-limiting examples of such statistics might include information regarding other sites that are currently offering the content in question (such information might be used by an uploader to determine how much bandwidth to devote to providing the content), bandwidth utilization (e.g., how fast the uploader is and/or how heavily the uploader is currently being utilized), quality of service (such information might be used by a downloader or tracker to evaluate a policy that requires a minimum level of service (e.g., a T1 connection) in order to proceed), and/or the like.

Figure 5:
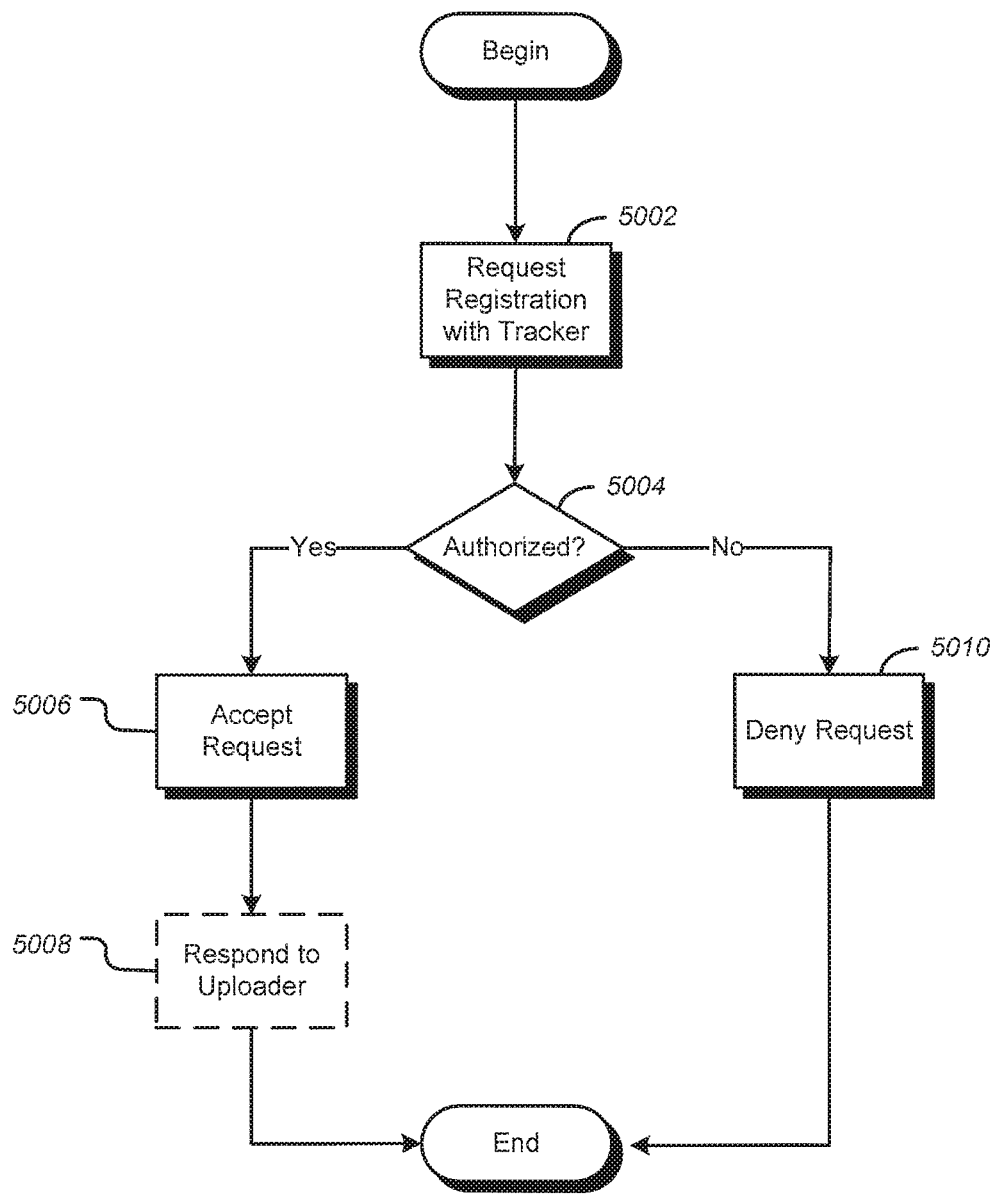
FIG. 5 is a flowchart illustrating a process for downloading fragmented files.

FIG. 5 illustrates one example of a process for registering an uploader with a tracker (5000). First, a request for registering a package and its contents with the tracker is provided by an uploader (5002). The tracker determines whether the uploader is authorized (5004), by, for example, checking a certificate associated with the uploader. If the uploader is authorized, then the request is accepted (5006), and (typically) information is stored regarding the uploader's endpoint address. Optionally, a response might also be sent to the uploader (5008), e.g., containing an acknowledgement, statistical information, and/or the like. Alternatively, if the uploader is not authorized, i.e., the answer at 5004 is "No", then a denial is provided to the uploader (5010) and the process terminates.

In some embodiments, trackers may also handle search requests from downloaders. For example, a downloader may obtain one or more manifests that identify the content (and possibly its associated policies) and (optionally) also identify one or more trackers. The downloader sends requests for relevant fragments to uploader(s) identified by the tracker(s), obtains the fragments, verifies the fragments, and assembles the fragments into digital content for access and use by the downloader/user in accordance with any relevant policy associated therewith.

Figure 6:
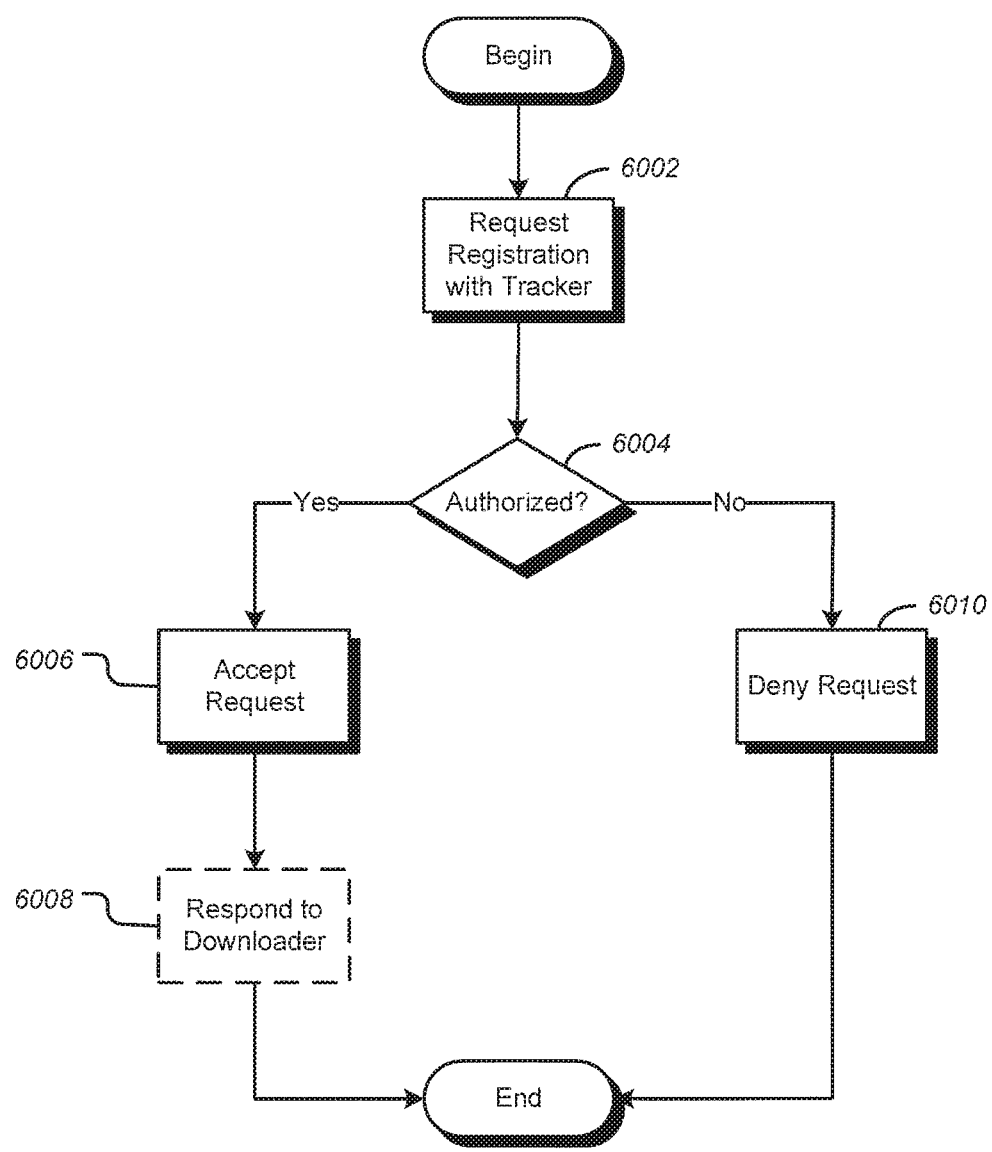
FIG. 6 is a flowchart illustrating a process for registering fragmented files with a tracker.

FIG. 6 illustrates one example of a process for registering a downloader with a tracker. (It will be appreciated that a downloader may register with more than one tracker.) First, a request is sent to the tracker, requesting, e.g., discovery of uploaders associated with a desired piece of content and/or a fragment thereof (6002). For example, in one embodiment, a downloader provides information identifying itself and the fragment(s) that the downloader desires. For example, the downloader may provide information establishing that it is a member of a certain group (e.g., a music club, a subscription service, and/or the like), and/or that it has certain hardware and/or software. The tracker determines whether the downloader is authorized (6004), e.g., by checking the identity and/or other information provided by the downloader for compliance with any relevant policies. If the downloader is authorized, then the request is accepted (6006), and, optionally, a response is sent to the downloader (6008), e.g., containing the endpoint address of one or more relevant uploaders capable of servicing the downloader's request, and/or statistical information (e.g., connection speed, etc.). Alternatively, if the downloader is not authorized, i.e., the answer at 6004 is "No", then a denial is provided to the downloader (6010).

Figure 7:
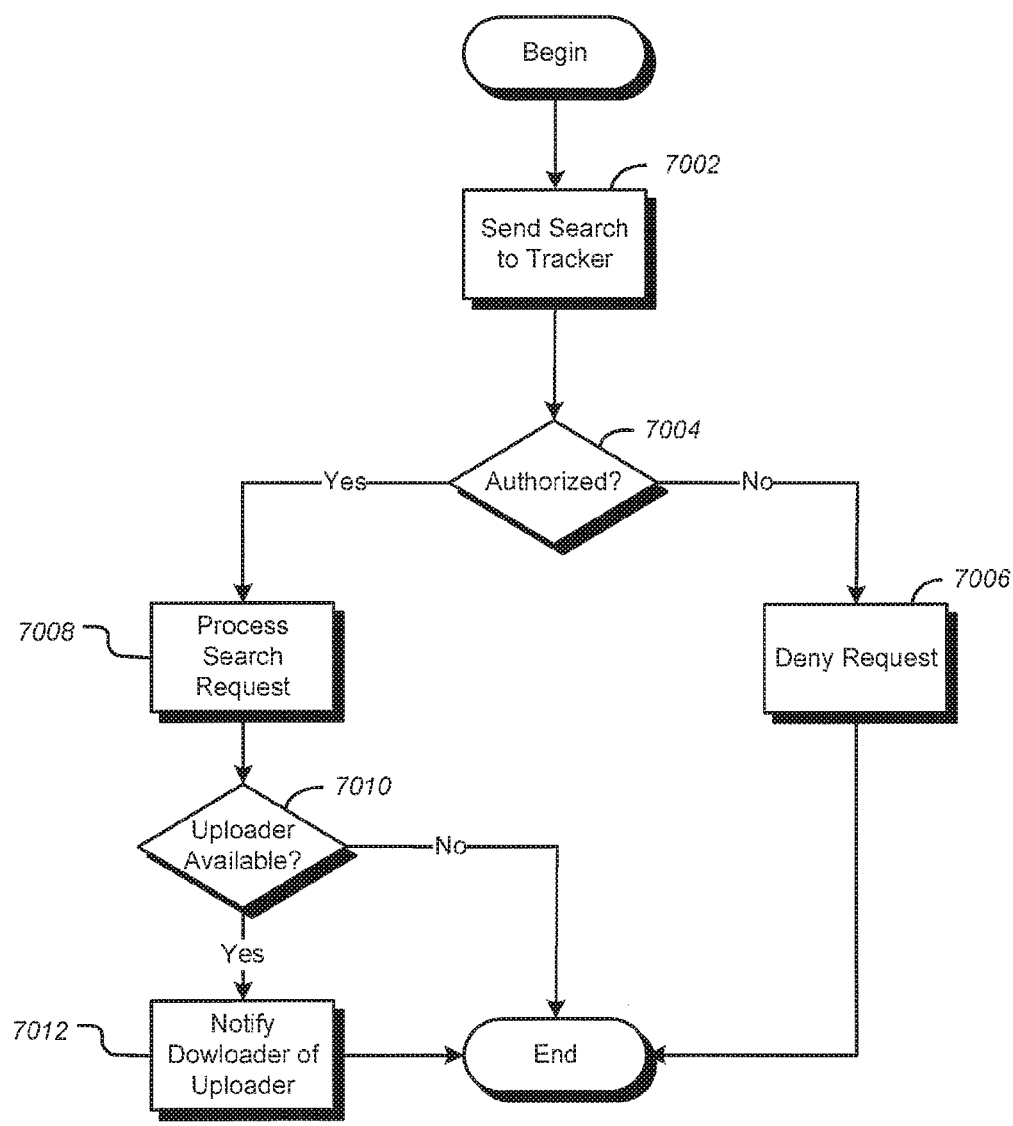
FIG. 7 is a flowchart illustrating a process for locating fragmented files.

FIG. 7 is a more detailed illustration of an interaction between a downloader and a tracker in one illustrative embodiment. As shown in FIG. 7, a downloader sends a search request to the tracker (7002). The tracker determines whether the downloader is authorized under the relevant policy or policies (7004). If the downloader is not authorized, then the request is denied (7006). Otherwise, the search request is processed (7008), and a determination is made as to whether an uploader is available to handle the downloader's request (7010). If no uploader is available to handle the request, then the process terminates. Otherwise, the downloader is notified of the location of the relevant uploader(s) (7012).

Figure 8:
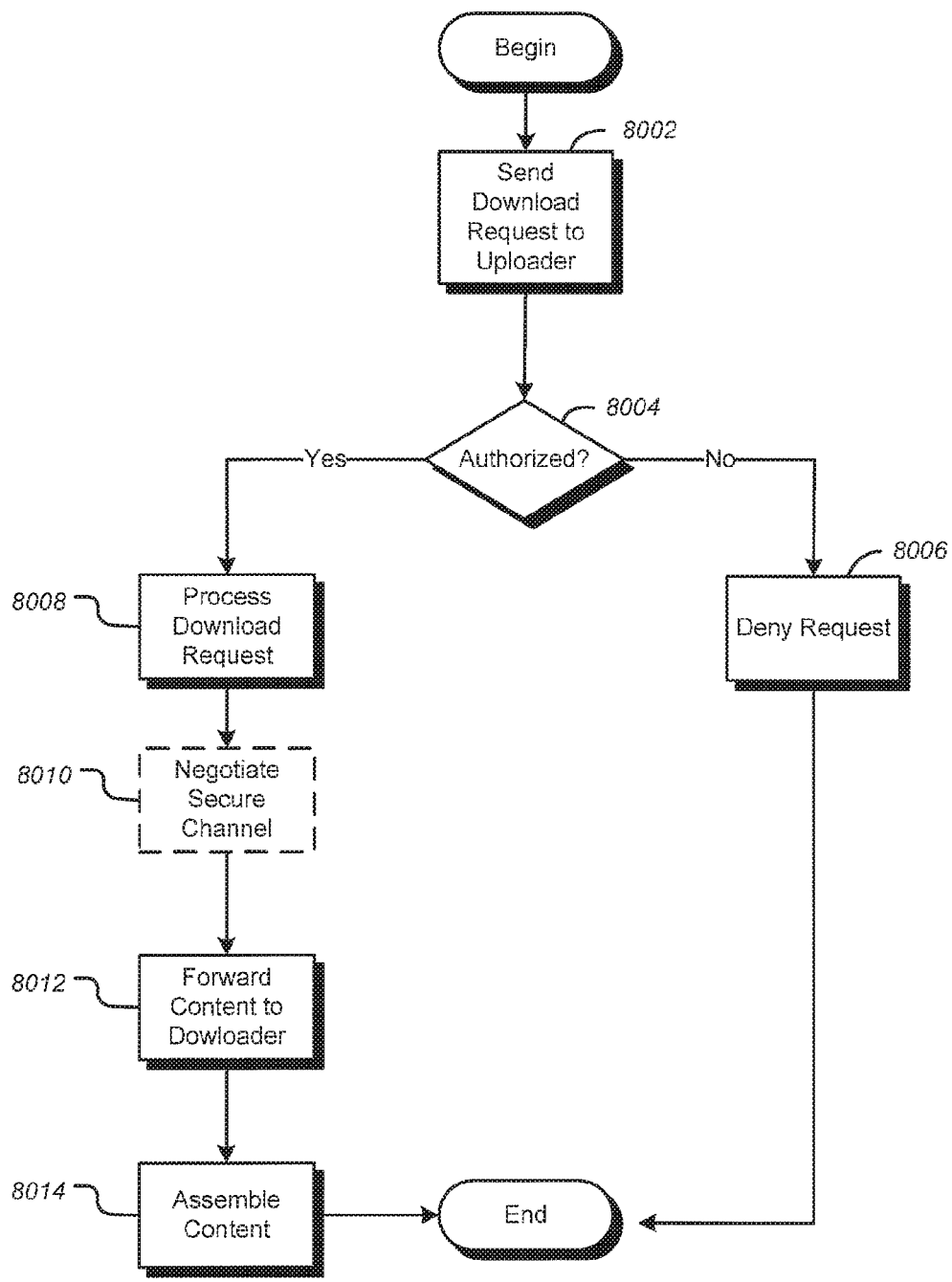
FIG. 8 is a flowchart illustrating a process for retrieving and playing content comprising a fragmented file.

Once the downloader has been apprised of at least one suitable uploader, then the downloader contacts the uploader (or uploaders) to obtain the fragment(s) necessary to fulfill the request. FIG. 8 illustrates one example of such a process.

As shown in FIG. 8, the downloader sends a request for fragments to the uploader(s) identified by the tracker (8002). The uploader(s) may then determine whether the downloader is authorized under policy (8004). If the downloader is not authorized, then the request is denied (8006) and the process terminates. Otherwise, the request is processed (8008). In one embodiment, this may, for example, entail sending a content reference back to the downloader, and (optionally) opening a secure channel between the uploader and downloader (8010), e.g., if required by policy. For example, a content reference may specify a Secure Socket Layer ("SSL") end point for file transfer, or the reference may convey a key used to encrypt and/or decrypt content over the communication channel between the uploader and downloader. In one embodiment, the content reference gives the downloader the information it needs to actually get the file, and can be thought of as any fully qualified way of referring to the content (e.g., by identifying where it is, what it is, etc.), such as a fully qualified name or moniker (e.g., a URL, a filename, and/or a protocol by which the content can be obtained). In one embodiment the fragment(s) are then forwarded to the downloader from the uploader (8012), and assembled for access by the downloader (8014), where "assembled" refers generally to the process of putting the fragment(s) into a form that is able to be consumed by the downloader/user. In some cases, this may entail putting together all the fragments associated with the content. In other cases one or more individual fragments may be sufficient for consumption (or the initiation or continuation of consumption) of the content.

In one embodiment, each of the tracker, uploader, and downloader functions as a Policy Enforcement Point; and each of the tracker, uploader, and downloader enforces policies contained in the manifest. For example, in one embodiment, each of the trackers, uploaders, and downloaders determines whether authentication policy, if any, is satisfied (e.g., whether the requesting endpoint is trusted); whether integrity policy, if any, is satisfied (e.g., whether the content is valid), and/or whether confidentiality policy, if any, is satisfied (e.g., whether a protected channel is necessary). In other embodiments, only some of the trackers, uploaders, and downloaders function as Policy Enforcement Points for some or all of the aforementioned (or other) policies.

EXAMPLES

Content Rental and Purchase

The systems, methods, apparatus, and software described herein are readily configurable to provide flexible business models for distributing content (e.g., movies, software, and/or the like) for rental, purchase, or the like. In one embodiment, consumers can choose the content they want to rent or purchase. For example, rental content may be less expensive than for-purchase content, but access to the rental content might expire after a fixed period of time. In some embodiments content may include embedded commercials. Alternatively, or in addition, in some embodiments the consumer may pay an additional premium for content without commercials.

For example, a video store may package a piece of content with additional material as defined by a policy. For example, commercials can be provided in separate fragments driven by a policy that specifies that purchasers who choose not to pay an additional premium must download the content with the commercials and assemble them within the content. Similarly, a policy for renters might define an expiration date after which the content will not be available without renewal of the rental contract or purchase. To implement such a business model, a policy could be included in the manifest associated with the content that requires the user to obtain a valid DRM license in order to access the content. For example, without limitation, the license could be of the form described in commonly assigned U.S. patent application Ser. No. 11/583,693, entitled "Digital Rights Management Engine Systems and Methods," published as U.S. Publication No. 2007/0180519 A1 on Aug. 2, 2007 (hereinafter "the '693 application"), which is hereby incorporated by reference in its entirety. Such a license could be used by a digital rights management engine (such as that described in the '693 application) running on the downloader's system to enforce the expiration date, viewing of commercials, and/or other rules associated with access to or other use of the content. For example, the fragments might be in encrypted form, and the downloader would determine from the manifest that a license was required in order to access the content. At that point, the downloader could determine whether to proceed with the download, knowing that without a valid license (e.g., a license that hasn't expired), the downloaded fragments would not be usable. Alternatively, or in addition, a DRM engine running at the downloader's site could evaluate any relevant licenses to see if they authorized a requested use of a file before it was downloaded, thus saving the user the inconvenience of downloading a file only to find that the desired use of the file is not authorized. In some embodiments, if a determination is made that the downloader does not have a license necessary for the intended use of the file, the tracker and/or uploader could return information to the downloader regarding how and/or where such a license could be obtained (e.g., a URL). In still other embodiments, policies such as expiration dates or trial periods can be directly enforced by uploaders and/or trackers (e.g., without use of a separate DRM license enforced by software on the downloader's computer system), who can keep track of the period during which a particular downloader is authorized to obtain content. Thus, it will be appreciated that policies can be expressed and enforced in any suitable manner, including at or by the downloader, at or by the uploader, at or by the tracker, and/or a combination of the above. Moreover, policies can be expressed in the manifest associated with a content file, can be expressed in licenses associated with the file via fragments or other means, can be enforced at the system architectural level, or any combination of these or other mechanisms.

Figure 9A:
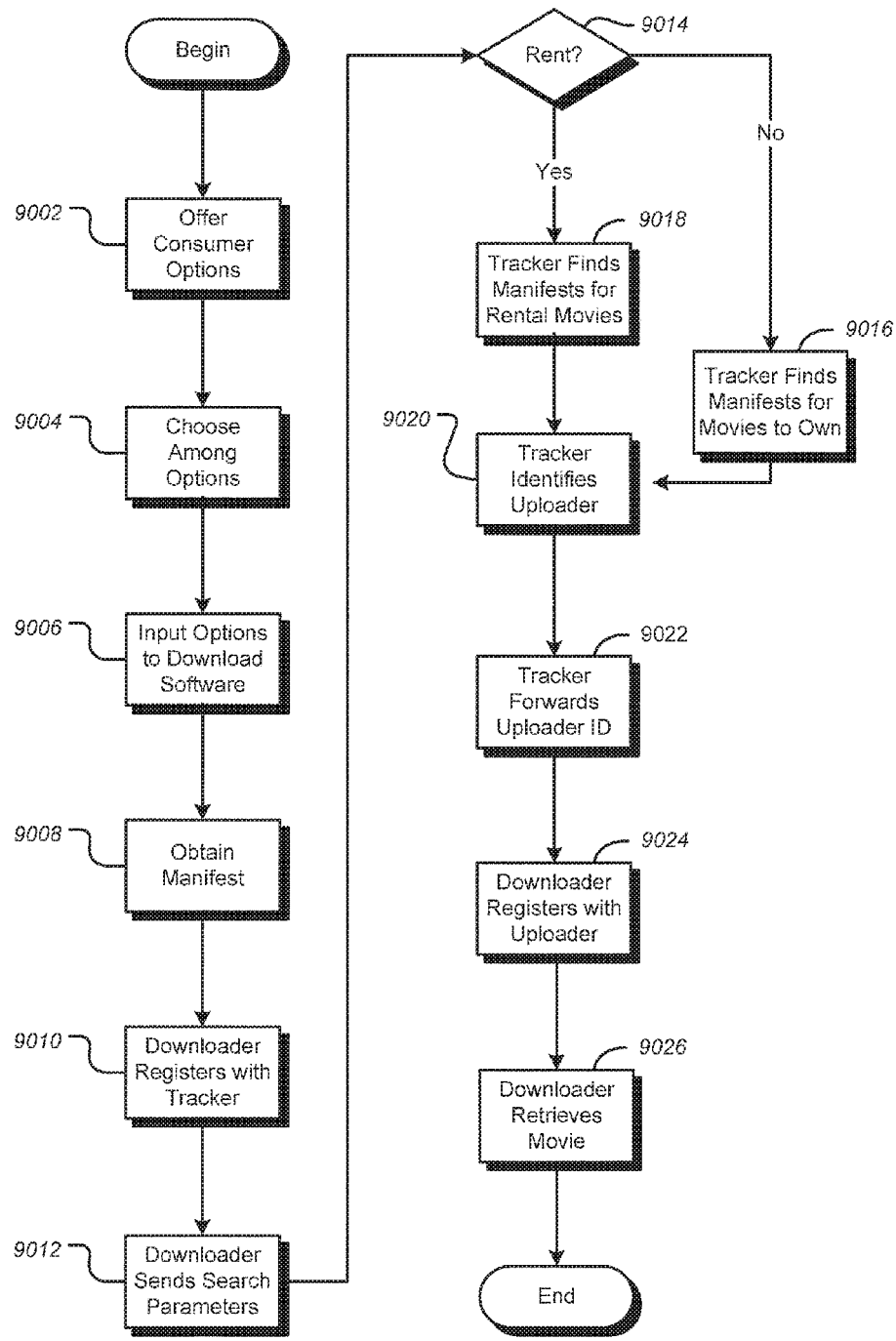
FIG. 9A is a flowchart illustrating a process for retrieving and playing content comprising a fragmented file.

An illustrative embodiment is shown in FIG. 9A. As shown in FIG. 9A, a consumer/downloader is offered the option of purchasing or renting a piece of content (9002). The consumer/downloader chooses the option, or set of options, defining the transaction (9004) and inputs his or her choices into his or her downloading software (9006). The consumer/downloader obtains a copy of the manifest for the content (9008), and the consumer/downloader registers with the tracker (9010) and sends the relevant search parameters to locate and retrieve the necessary content and policies defined by the consumer/downloader's selections (9012). If the consumer/downloader had chosen to purchase the content, then, following the "No" branch of the "Rent?" decision point (9014), the tracker identifies those manifests that relate to purchasing the content (9016). (It will be appreciated that other branches, such as a branch for commercial-free premium content could also be provided.) Alternatively, the "Yes" branch is followed and the tracker identifies those manifests that relate to renting the content (9018). In either case, the tracker next identifies an uploader (9020) and forwards the uploader's identifier to the consumer/downloader (9022), whereupon the consumer/downloader registers with the uploader (9024) and retrieves the content in accordance with the appropriate policy (9026). For example, the policy might require the consumer/downloader to have or obtain a valid DRM license enforceable by a tamper-resistant DRM engine on the consumer/downloader's computer system.

Figure 9B:
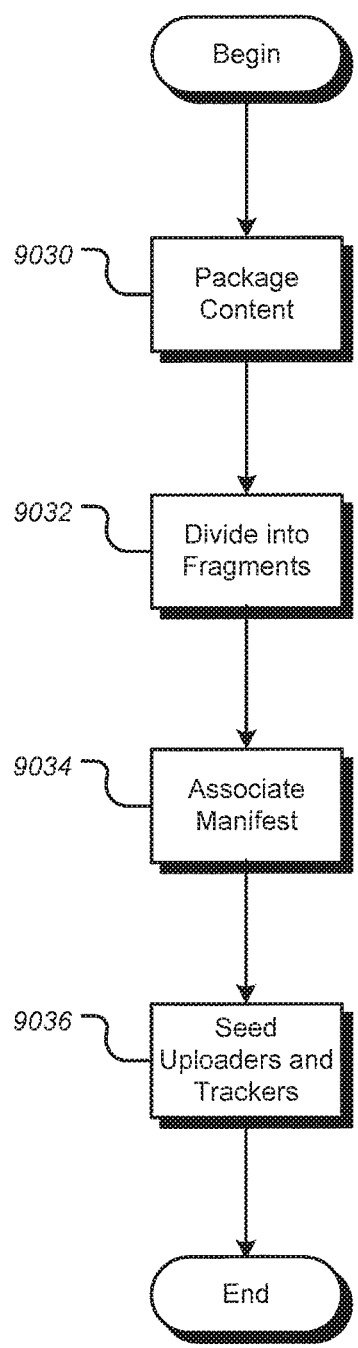
FIGS. 9B and 9C show another example process for packaging, retrieving, and playing content comprising a fragmented file.
Figure 9C:
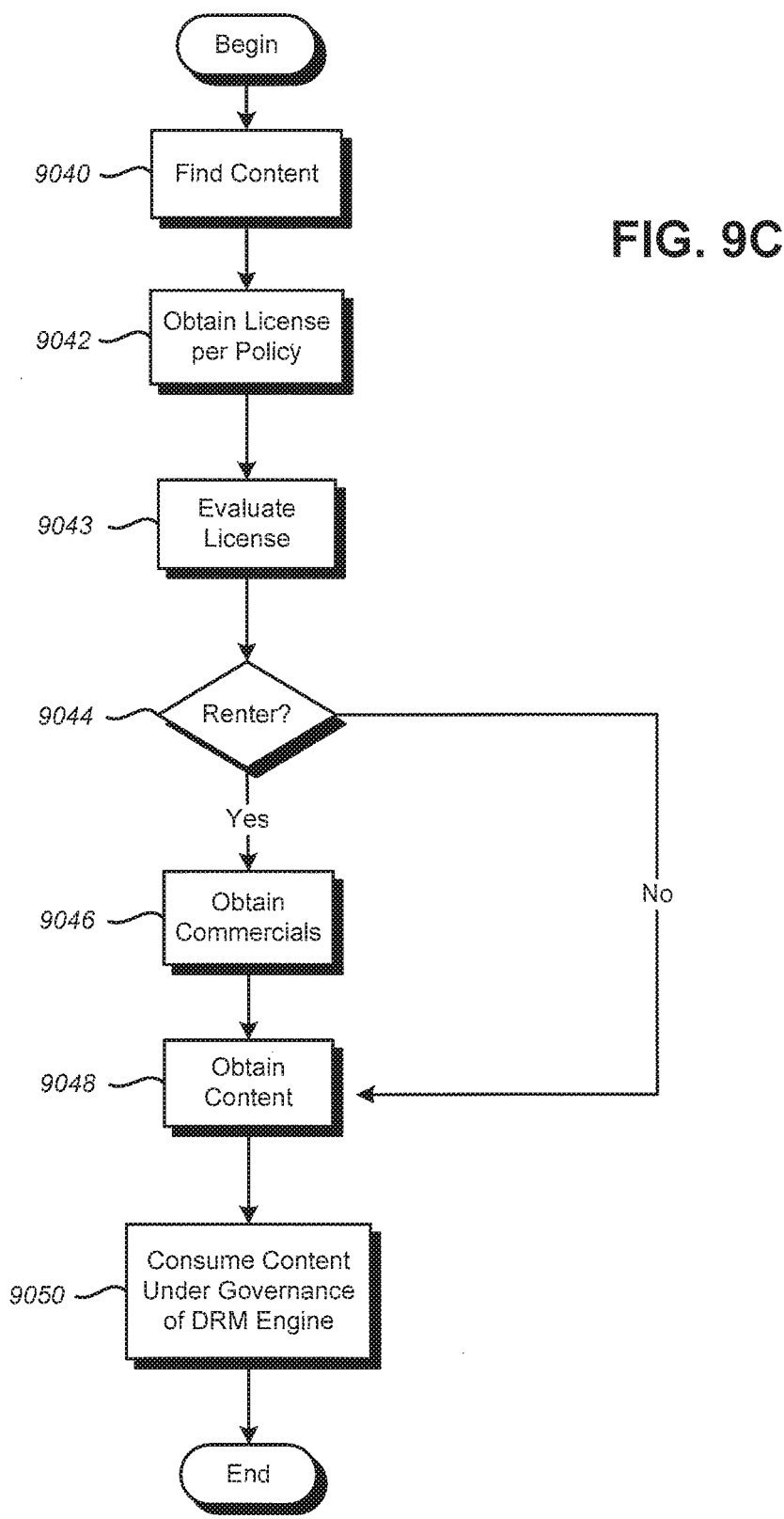

Another example is shown in FIGS. 9B and 9C. As shown in FIG. 9B, a content provider may wish to provide content that is governed at least in part using a DRM engine such as that described in the '693 application. The content provider may further wish to require users who have merely rented the content to view certain dynamically synthesized commercials, while allowing users who have purchased the content to play the content without viewing such commercials. As shown in FIG. 9B, the content provider might use the techniques described in the '693 application to package the content (e.g., encrypt it and associate a license with it) (9030). The content provider also fragments the content (9032) and associates a manifest with the content (9034), the manifest including a policy that (a) requires downloaders to present a SAML assertion indicating that they have a valid version of a DRM engine and/or file sharing software (b) requires downloaders to first download a fragment containing a DRM license, which, once evaluated by the DRM engine, will determine whether the user is a renter or a purchaser, and (c) requires downloaders to next download the commercials if the DRM engine determines from the DRM license that the downloader is a renter. The content provider (or a packager acting on behalf thereof) then distributes the content fragments and the manifest to one or more uploaders and trackers, as described elsewhere herein (9036).

Referring to FIG. 9C, a user may perform a search for the content using a standard search engine or any other suitable means (9040). Upon discovering (e.g., via a tracker) the content packaged in FIG. 9B, the user, in accordance with the policy specified in the manifest, would first be required to obtain a valid license (9042). For example, the manifest might direct the user to a location at which such licenses could be obtained, whereupon the user would provide any relevant information (e.g., payment information, identity information, etc.), and be provided with a DRM license. In other embodiments, the manifest might simply require that a specific fragment containing or referencing the license be obtained first, in which case the confidentiality, integrity, and/or other policies specified for that fragment would be applied to, e.g., protect the license. Such an embodiment might be desirable if, for example, the license itself was not independently protected, e.g., by a DRM system. In other embodiments, the license might be included in a fragment that also contains at least a portion of the content to which the license applies. Thus it should be appreciated that the license can be obtained in any suitable manner. For example, without limitation, a tracker might direct the user to an uploader who can provide the user with a fragment containing that uploader's DRM license. Although this license would typically be invalid for the downloader, the license could contain a pointer to a location at which valid licenses could be obtained.

Referring once again to FIG. 9C, once the downloader receives a valid DRM license, the downloader's DRM engine evaluates the DRM license 9043) and determines whether the user is a renter or a purchaser (9044). If it is determined that the user is a renter (i.e., a "Yes" exit from block 9044), then, in accordance with the policy expressed in the manifest, the file sharing software would require the user to first obtain the fragments containing the commercials (9046). If, on the other hand, it is determined that the user is a purchaser (i.e., a "No" exit from block 9044), then the file sharing software would permit the user to immediately begin to obtain the content fragments (9048). Upon obtaining the content fragments, the user's DRM engine would control their decryption, e.g., using the decryption key contained in or referenced by the DRM license (9050). The DRM engine would also enforce any other rules or constraints specified in the DRM license, additional non-limiting examples of which can be found in the '693 application. Thus, in this example, the policy specified in the manifest mandates a temporal ordering of the fragments (e.g., first the license fragment is obtained, then any required commercials, then the content), while the DRM engine controls decryption and enforcement of any other requirements specified in the DRM license (e.g., an expiration date after which the content can no longer be viewed).

It will be appreciated that the example described in connection with FIGS. 9B and 9C is provided for purposes of illustration, and that a number of changes could be made without departing from the principles disclosed herein. For example, the manifest need not require the license fragment to be obtained first, the determination as to whether the user is a renter or purchaser could be made independently of the license, other distinctions besides renter or purchaser could be made, and other obligations than viewing commercials could be enforced. Thus, while this example illustrates one possible scenario in which a DRM system and a file sharing system interact to control access to a piece of protected content, it will be appreciated that this example illustrates many different independently inventive concepts associated with the inventive body of work, that need not be combined in the specific manner presented in this example.

Content Control

In another example, a content provider offers content having multiple segments, such as a variety show or a program composed of skits. Some segments have more explicit material then others, and the content provider wants to control younger purchasers' access to this material without frustrating older subscribers. To do this, the provider can specify a policy in the manifest that requires that purchasers meet certain age requirements in order to download and incorporate certain fragments. For example, in one embodiment each segment of the content has associated policies or metadata (or both) that define the conditions necessary for inclusion of that segment in the downloaded content. The fragments that compose the content are delivered "on the fly" to the downloader for synthesis into the content. In another example, the content is composed of all fragments that define the different segments, and the policy for the entire content defines which fragments (or segments) will be presented to the purchaser when the content is played.

Multiple Content Distribution Channels

In still another example, content is composed of one or more fragments that are associated with one or more licenses used to decrypt the fragments. As described above, policies and licenses can be defined to govern the fragments and content. In one embodiment, one or more fragment licenses are targeted ("locked") to a specific device (as opposed to a specific user, which could also be done in other embodiments) where the content is to be rendered. For example, a consumer may have multiple devices for playing content (e.g., a computer, a home entertainment system, and a cell phone, each capable of playing a movie or album). In one embodiment, a content distributor can designate one or more of these devices for playing the content. In one embodiment, one or more fragments are defined to be license fragments; and a policy is associated with these license fragments, specifying that the license fragments be generated or obtained dynamically. In some embodiments, the policy may require that the device ID of the rendering device be presented for authorization and authentication. Thus a device will have a specific license synthesized for it on the fly when it fetches the content locally. Thus, for example, in some embodiments policy can be used not only to specify who the receiver and/or sender can be, policy can also be used to specify such things as diverse as whether a particular fragment or fragments can be cached, whether a particular fragment or fragments need to be generated or obtained dynamically (e.g., a license fragment, an advertisement fragment, etc.), in which case a pointer to a location at which the dynamically generated fragment can be obtained will typically be provided, and/or the like. For example, an advertisement fragment might point to a location at which a current version of an advertisement can be obtained, thereby enabling the advertisements that are included to vary over time or in accordance with system specific parameters (e.g., usage information obtained from the user) without requiring replacement of the advertisement fragment itself, which simply contains a pointer to the advertisement.

Remuneration and Auditing

In another example, a service provider can monitor and control the flow of unlicensed (e.g., potentially pirated) content through its system. The service provider might deploy a group of trackers configured to enforce a policy that specifies that if a piece of content offered by an uploader (or requested by a downloader) has certain characteristics that indicate that its distribution might be unauthorized (e.g., the content does not have a license associated with it, or the content or its manifest does not specify or provide a mechanism by which such a license can be obtained), then the tracker will direct the user to a service (e.g., operated by or on behalf of the service provider or a content owner) that will require the user to pay a predefined fee or provide certain predefined information in order to obtain the content. The fee might, for example, have been negotiated between the service provider and the content creator. If, on the other hand, the content has an associated license or otherwise appears to be offered in an authorized manner, then the tracker would allow the downloader to obtain the content, subject to any other policies that might be specified in the associated manifest. In this way, the service provider's system could provide some measure of protection against the unauthorized distribution of content.

Embodiments have been described in which a packager processes digital content into packaged fragments and generates a manifest including policies and metadata associated with the content. An uploader is seeded with the fragments and manifest, and registers with one or more trackers. A downloader obtains a manifest by a discovery process, and uses it, and optionally one or more trackers, to obtain the content. For example, a downloader might forward search requests for fragments to one or more trackers, which, in turn, are operable to (a) locate one or more uploaders that can meet the request, subject to any policy limitations, and (b) return the identities of the uploader(s) to the downloader. The downloader then contacts one or more uploaders identified by the tracker and forwards requests for the fragments to the uploader(s). The uploader(s) forward the fragments to the downloader, possibly using a secure channel. The downloader assembles the digital content from the fragments for access by a user. The operations of the entities are subject to policy limitations associated with the fragments, the content as a whole, or both.

Figure 10A:
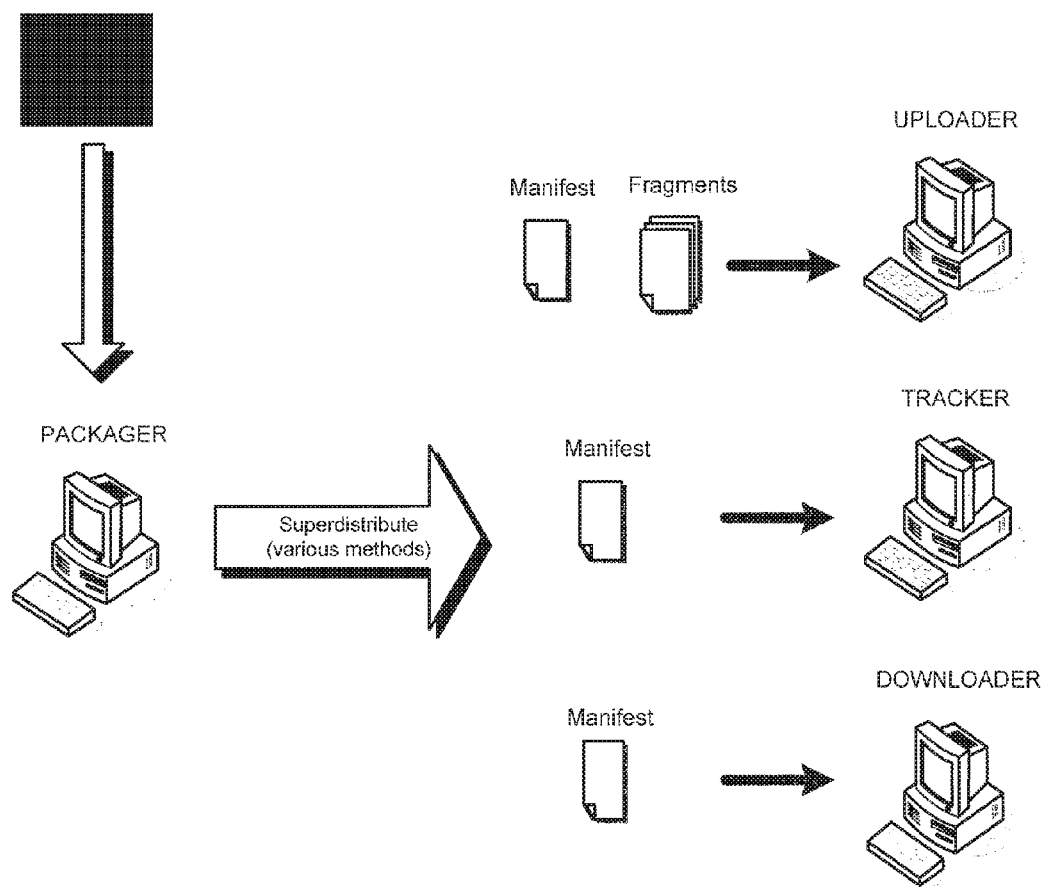
FIGS. 10A, 10B, and 10C illustrate aspects of an illustrative system for practicing some embodiments of the inventive body of work.
Figure 10B:
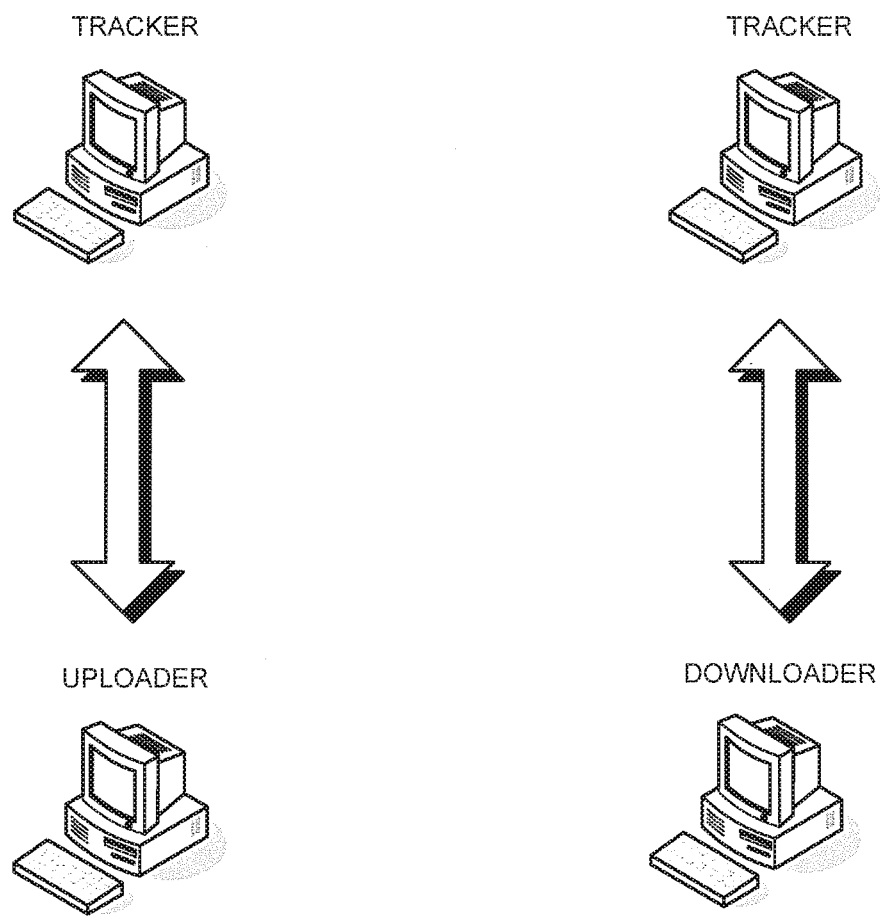
Figure 10C:
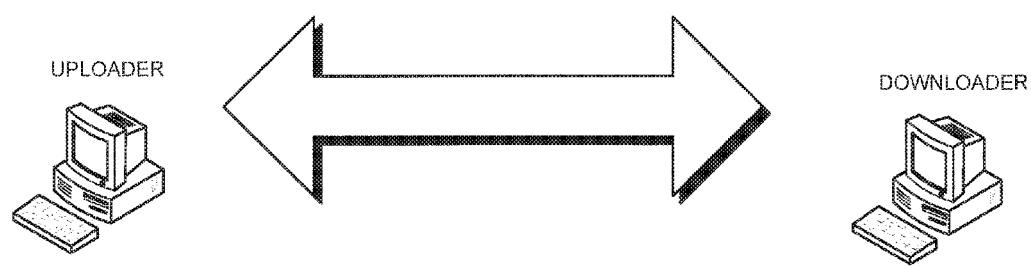

FIGS. 10A, 10B, and 10C illustrate aspects of an illustrative system for practicing some embodiments of the inventive body of work. As shown in FIG. 10A, an author, creator, and/or distributor of digital content can use a packager to process the content and prepare it for distribution via one or more uploaders and trackers to one or more downloaders. As required or specified by the author, the packager can apply policies to govern the packaging process, and/or specify policies in the manifest associated with the content to govern use of the content by other entities. For example, policies can be included in the manifest that require certain forms of authentication between various participants in the system (e.g., uploaders, downloaders, and trackers), that specify certain confidentiality requirements, and/or that otherwise govern the access to or use of the content as a whole or the individual fragments thereof. In general terms, the packager applies any relevant policy, and generates fragments and a manifest associated therewith. As shown in FIG. 10A, the fragments can be distributed to one or more uploaders, and the manifests can be distributed to one or more uploaders, trackers, and/or downloaders.

As shown in FIG. 10B, uploaders can register with trackers, who, in some embodiments, can acknowledge or deny the uploaders' requests to distribute fragments based on policy. If an uploader is authorized to distribute fragments, the location of the uploader can be recorded, as can information on the fragments that the uploader is able to supply. This information can then be given to authorized downloaders. In some embodiments, trackers may also provide other information to the uploaders, such as relevant statistical information (e.g., usage statistics).

As is also shown in FIG. 10B, downloaders can similarly register with trackers. For example, a downloader may submit, to a tracker, a request to find one or more fragments. The tracker might then acknowledge or deny the request based on relevant policy (e.g., a policy requiring that the user have certain credentials). If a request is authorized, the tracker can return the location of one or more authorized uploaders who have the requested fragments, and/or other information (e.g., usage statistics).

In some embodiments, trackers may require more information from potential downloaders (or uploaders) than in others. For example, in some embodiments trackers may allow anonymous downloads, while in other embodiments trackers may require a stronger version of identification, while in yet other embodiments trackers may require presentation of an attribute/credential associated with the application being used to obtain/use content, so that the tracker (or uploader) can be assured that the content will be handled properly (e.g., that it won't be processed by a hacked version of the relevant file sharing (or DRM) software or hardware). In still other embodiments, some combination of these (or other) requirements could be used. Similarly, in some embodiments, downloaders might have policy requiring trackers to identify/authenticate themselves, so that even if the downloader is given the URL of a bogus tracker that wants to propagate a virus, that tracker will not be able to authenticate itself, thereby protecting the downloader. Thus it will be appreciated that systems can be configured in which any suitable trust relationship is required to be established between any or all of uploaders, trackers, downloaders, or other system entities. For example, a tracker for a particular service provider may want to limit content distribution to that service provider's customers, and thus require a potential downloader to present an appropriate credential establishing that the potential downloader is such a customer. Such a policy could be included in the manifest associated with the content, or simply codified in the hardware or software the tracker uses to evaluate requests. Similarly, downloaders may wish to require that the trackers and/or uploaders with which they communicate are associated with or certified by one or more trusted parties, and/or may wish to require that any communications with uploaders be performed using a trusted channel. Such policies can, for example, be maintained and enforced by the downloader's file sharing software. It will be appreciated, however, that while several examples have been given of different policies that might be specified regarding the interaction between trackers, uploaders, and downloaders in certain useful embodiments, that any suitable policies or requirements can be used.

As shown in FIG. 10C, once uploaders and downloaders have located each other using one or more trackers, manifests, and/or other means, they can then exchange data as authorized by any relevant policy. Typically, this will involve the downloader downloading fragments from the uploader, although other usage patterns are also possible (for example, in the general case, downloaders, uploaders, and/or trackers can be configured to support any suitable service interface, and to make and/or respond to any suitable service inquiry). The downloader can then consume the content in accordance with any associated policy and/or other license information associated therewith.

Figure 11:
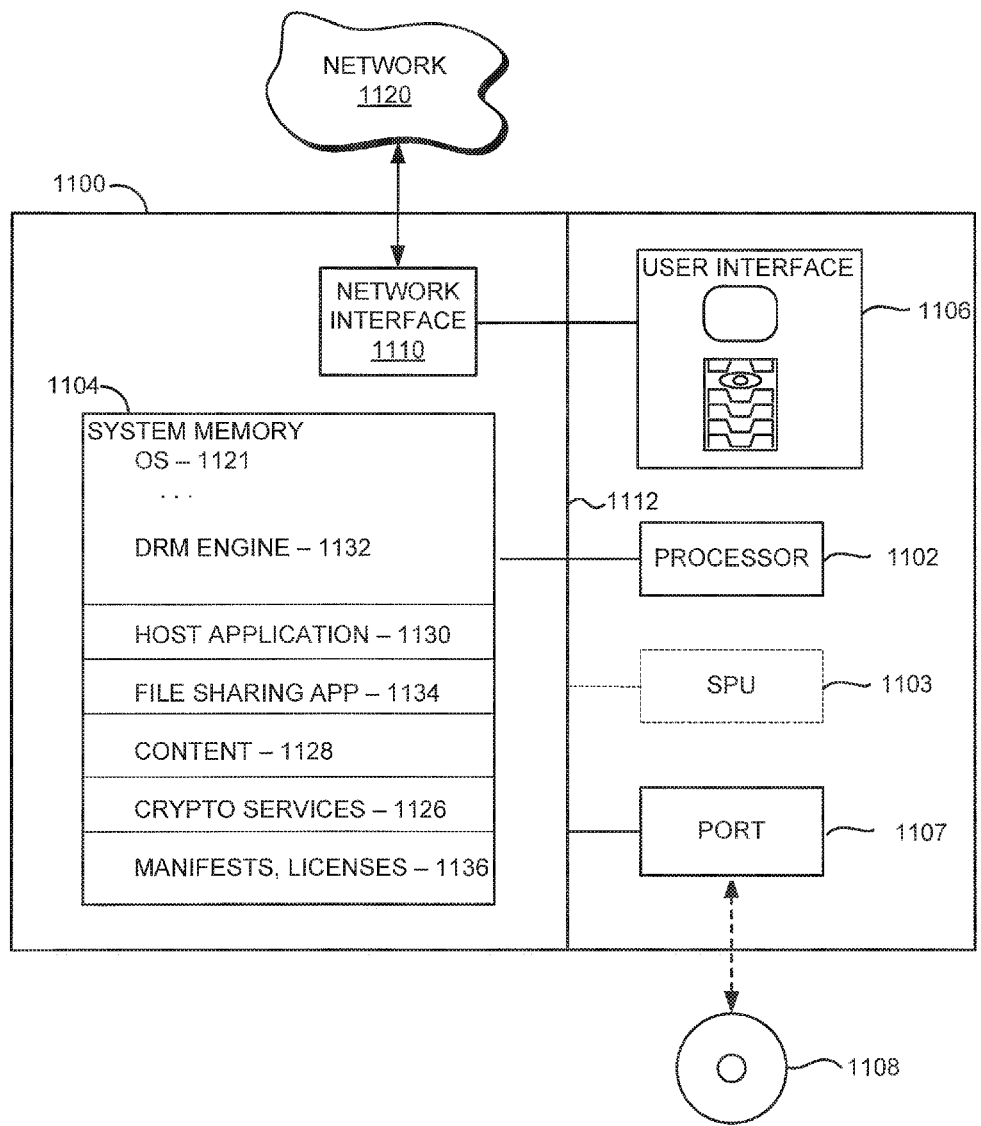
FIG. 11 shows a more detailed example of a computing system that could be used to practice embodiments of the inventive body of work.

FIG. 11 shows a more detailed example of a system 1100 that could be used to practice embodiments of the inventive body of work. For example, system 1100 might comprise an embodiment of an end user's device acting as a downloader, a content provider's device acting as a packager, tracker, and/or uploader, and/or the like. For example, system 1100 may comprise a general-purpose computing device such as a personal computer or network server, or a specialized computing device such as a cellular telephone, personal digital assistant, portable audio or video player, television set-top box, kiosk, gaming system, or the like. System 1100 will typically include a processor 1102, memory 1104, a user interface 1106, a port 1107 for accepting removable memory 1108, one or more network interfaces 1110, and one or more buses 1112 for connecting the aforementioned elements. The operation of system 1100 will typically be controlled by processor 1102 operating under the guidance of programs stored in memory 1104. Memory 1104 will generally include both high-speed random-access memory (RAM) and non-volatile memory such as a magnetic disk and/or flash EEPROM. In some embodiments, portions of memory 1104 may be restricted, such that they cannot be read from or written to by other components of the system 1100. Port 1107 may comprise a disk drive or memory slot for accepting computer-readable media 1108 such as floppy diskettes, CD-ROMs, DVDs, memory cards, SD cards, other magnetic or optical media, and/or the like. Network interface 1110 will typically be operable to provide a connection between system 1100 and other computing devices (and/or networks of computing devices) via a network 1120 such as the Internet or an intranet (e.g., a LAN, WAN, VPN, etc.), and may employ one or more communications technologies to physically make such connection (e.g., wireless, Ethernet, and/or the like). In some embodiments, system 1100 might also include a processing unit 1103 that is protected from tampering by a user of system 1100 or other entities. Such a secure processing unit ("SPU") can help enhance the security of sensitive operations such as key management, signature verification, and other aspects of the policy and/or license enforcement process.

As shown in FIG. 11, memory 1104 of computing device 1100 may include a variety of programs or modules for controlling the operation of computing device 1100. For example, memory 1104 will typically include an operating system 1121 for managing the execution of applications, peripherals, and the like; a host application 1130 for rendering or packaging protected electronic content; a file sharing application 1134 for performing the downloader, uploader, and/or tracker actions described herein, and (optionally) a DRM engine 1132 for implementing some or all of the rights management functionality described in the '693 application. As described in the '693 application, DRM engine 1132 may comprise, interoperate with, and/or control a variety of other modules, such as one or more cryptographic modules 1126 for performing cryptographic operations such as encrypting and/or decrypting content, computing hash functions and message authentication codes, evaluating digital signatures, and/or the like. Memory 1104 will also typically include content items (and/or fragments thereof) 1128 and associated manifests and/or licenses 1136, as well as cryptographic keys, certificates, and the like (not shown).

One of ordinary skill in the art will appreciate that the systems and methods described herein can be practiced with computing devices similar or identical to that illustrated in FIG. 11, or with virtually any other suitable computing device, including computing devices that do not possess some of the components shown in FIG. 11 and/or computing devices that possess other components that are not shown. Thus it should be appreciated that FIG. 11 is provided for purposes of illustration and not limitation.

Thus, systems, software, methods, and apparatus have been described for providing fragmented digital content, and, in particular, fragmented digital content in which the fragments and/or the content as a whole are subject to policy control. Although certain specific examples have been offered for illustrative purposes, those having ordinary skill in the art will understand that many others embodiments of the systems, software, methods, and apparatus described herein can be made without departing from either the scope or the spirit of the inventive body of work.

What is claimed is:

1. A method performed by a system comprising a processor and a non-transitory computer-readable storage medium storing instructions that, when executed by the processor, cause the processor to perform the method, the method comprising:

receiving a plurality of content fragments, each of the plurality of content fragments comprising at least a portion of a piece of digital content;

accessing a manifest securely associated with the piece of digital content, the manifest comprising a reference to the plurality of content fragments, policy information associated with each content fragment of the plurality of content fragments, and policy information associated with the piece of digital content, wherein the policy information associated with each content fragment of the plurality of content fragments articulates at least one requirement for validating an associated content fragment;

constructing at least part of the piece of digital content by combining the plurality of content fragments based, at least in part, on the reference, the policy information associated with each content fragment of the plurality of content fragments, and the policy information associated with the piece of digital content included in the manifest, wherein constructing the at least part of the piece of the digital content comprises validating each content fragment of the plurality of content fragments in accordance with the at least one requirement of the policy information associated with the content fragment; and rendering the at least part of the piece of digital content in accordance with the policy information associated with the piece of digital content included in the manifest.

2. The method of claim 1, wherein receiving the plurality of content fragments comprises receiving the plurality of content fragments from an uploader.

3. The method of claim 2, wherein the method further comprises:

requesting the plurality of content fragments from the uploader; and presenting authorization information to the uploader to determine if the system is authorized to receive the plurality of content fragments.

4. The method of claim 3, wherein the authorization information comprises an identity of an entity associated with the system.

5. The method of claim 1, wherein the policy information associated with the piece of digital content includes information related to a license associated with the piece of digital content.

6. The method of claim 1, wherein accessing the manifest comprises receiving the manifest from a tracker.

7. The method of claim 1, wherein the manifest further comprises a unique identifier associated with the piece of digital content.

8. The method of claim 1, wherein the manifest further comprises metadata associated with the piece of digital content.

9. The method of claim 1, wherein the manifest further comprises metadata associated with the plurality of content fragments.

10. The method of claim 1, wherein the manifest further comprises distribution policy information associated with the piece of digital content.

11. The method of claim 1, wherein the manifest further comprises integrity policy information associated with the piece of digital content.

12. The method of claim 1, wherein the policy information associated with the piece of digital content comprises a condition requiring that the system possess a valid license prior to rendering the at least part of the piece of digital content.

13. The method of claim 1, wherein the policy information associated with the piece of digital content comprises a condition relating to an order in which the plurality of content fragments should be obtained.

14. The method of claim 1, wherein the policy information associated with the piece of digital content comprises a condition relating to the distribution of the piece of digital content.

15. The method of claim 1, wherein the policy information associated with the piece of digital content comprises a condition relating to a file type of the piece of digital content.

16. A non-transitory computer-readable storage medium storing instructions that, when executed by a processor of a system, cause the processor to:

receive a plurality of content fragments, each of the plurality of content fragments comprising at least a portion of a piece of digital content;

access a manifest securely associated with the piece of digital content, the manifest comprising a reference to the plurality of content fragments, policy information associated with each content fragment of the plurality of content fragments, and policy information associated with the piece of digital content, wherein the policy information associated with each content fragment of the plurality of content fragments articulates at least one requirement for validating an associated content fragment;

construct at least part of the piece of digital content by combining the plurality of content fragments based, at least in part, on the reference, the policy information associated with each content fragment of the plurality of content fragments, and the policy information associated with the piece of digital content included in the manifest, wherein constructing the at least part of the piece of the digital content comprises validating each content fragment of the plurality of content fragments in accordance with the at least one requirement of the policy information associated with the content fragment; and render the at least part of the piece of digital content in accordance with the policy information associated with the piece of digital content included in the manifest.

17. The non-transitory computer-readable storage medium of claim 1, wherein receiving the plurality of content fragments comprises receiving the plurality of content fragments from an uploader.

18. The non-transitory computer-readable storage medium of claim 17, wherein the instructions are further configured to cause the processor to:

request the plurality of content fragments from the uploader; and present authorization information to the uploader to determine if the system is authorized to receive the plurality of content fragments.

19. The non-transitory computer-readable storage medium of claim 16, wherein the policy information associated with the piece of digital content includes information related to a license associated with the piece of digital content.

* * * * *